United States Patent
Smith et al.

(10) Patent No.: US 10,113,668 B2
(45) Date of Patent: Oct. 30, 2018

(54) SUBSEA FORTIFIED ZONE MODULE

(71) Applicant: KELLOGG BROWN & ROOT LLC, Houston, TX (US)

(72) Inventors: Austin Glenn Smith, Tomball, TX (US); Robert Hernandez, Stafford, TX (US); Michael Hardy, Houston, TX (US)

(73) Assignee: Kellogg Brown & Root LLC, Houston, TX (US)

( * ) Notice: Subject to any disclaimer, the term of this patent is extended or adjusted under 35 U.S.C. 154(b) by 0 days.

(21) Appl. No.: 15/154,103

(22) Filed: May 13, 2016

(65) Prior Publication Data

US 2016/0376875 A1    Dec. 29, 2016

Related U.S. Application Data

(60) Provisional application No. 62/184,602, filed on Jun. 25, 2015.

(51) Int. Cl.
*F16L 3/22* (2006.01)
*F16L 1/20* (2006.01)

(52) U.S. Cl.
CPC .. *F16L 3/22* (2013.01); *F16L 1/20* (2013.01)

(58) Field of Classification Search
CPC ................. F16L 3/22; E21B 43/013
See application file for complete search history.

(56) References Cited

U.S. PATENT DOCUMENTS

| | | | | |
|---|---|---|---|---|
| 1,510,860 | A * | 10/1924 | Peck | F24D 19/081 137/527 |
| 1,710,811 | A * | 4/1929 | Dewald | F28F 1/36 165/79 |
| 1,787,448 | A * | 1/1931 | Holton | F28D 7/06 165/166 |
| 5,839,383 | A * | 11/1998 | Stenning | B63B 25/14 114/72 |
| 8,051,875 | B2 * | 11/2011 | Edwards | F16K 17/02 137/461 |
| 8,235,628 | B2 * | 8/2012 | Lamison | F16L 1/161 138/26 |
| 2004/0031614 | A1 * | 2/2004 | Kleinhans | E21B 19/002 166/355 |
| 2009/0211263 | A1 * | 8/2009 | Coyle | F17C 9/02 62/50.2 |
| 2010/0252227 | A1 * | 10/2010 | Sten-Halvorsen | E21B 36/001 165/45 |
| 2011/0240157 | A1 * | 10/2011 | Jones | F16K 17/02 137/613 |
| 2012/0000667 | A1 * | 1/2012 | MOgedal | E21B 36/001 166/368 |
| 2016/0076334 | A1 * | 3/2016 | Maher | E21B 34/04 137/12 |
| 2016/0222761 | A1 * | 8/2016 | Cain | E21B 43/01 |

* cited by examiner

*Primary Examiner* — Benjamin F Fiorello
(74) *Attorney, Agent, or Firm* — Gary Machetta

(57) ABSTRACT

A system for conveying fluids at a subsea location includes a module having a flow line formed of plurality of linear sections. At least two of the sections have a geometrically parallel arrangement. The module includes an inlet supplying fluid to the flow line and an outlet receiving fluid from the flow line.

8 Claims, 3 Drawing Sheets

SUBSEA FORTIFIED ZONE MODULE

This application claims the benefit of U.S. Provisional Application No. 62/184,602 filed on Jun. 25, 2015, the entirety of which is incorporated by reference herein. The present disclosure generally relates to systems and methods for conveying fluids.

BACKGROUND

1. Field of the Disclosure

Many situations involve conveying fluids between two or more points. In some instances, the area available to install piping or other conduits for such fluids is limited. The present disclosure addresses the need to convey fluids in situations where space is limited. The present disclosure addresses the need for simplified structures that can be built at lower costs and that can be tested prior to placement.

2. Description of the Related Art

A system for conveying fluids at a subsea location includes a module having, a flow line formed of plurality of linear sections. At least two of the sections have a geometrically parallel arrangement. The module includes an inlet supplying fluid to the flow line and an outlet receiving fluid from the flow line. In some embodiments, the flow line communicates fluid between the inlet and the outlet in a hydraulically serial fashion.

SUMMARY

It should be understood that examples of certain features of the disclosure have been summarized rather broadly in order that the detailed description thereof that follows may be better understood, and in order that the contributions to the art may be appreciated. There are, of course, additional features of the disclosure that will be described hereinafter and which will in some cases form the subject of the claims appended thereto.

BRIEF DESCRIPTION OF THE DRAWINGS

For detailed understanding of the present disclosure, references should be made to the following detailed description of the preferred embodiment, taken in conjunction with the accompanying drawings, in which like elements have been given like numerals and wherein.

DETAILED DESCRIPTION

One non-limiting environment where the advantages of the present disclosure may be of particular value involves a subsea production system that includes a high-integrity pressure protection system (HIPPS). A HIPPS is designed to prevent over-pressurization of flow lines downstream of a high pressure source. In an overpressure condition, the HIPPS isolates the high pressure source before the overpressure condition damages vulnerable downstream equipment. Conventionally, a "fortified" section consisting of pipes that connect the HIPPS to a subsea production system. The distance the fluid flows in the fortified section is selected to provide enough time to detect an overpressure condition in order for the HIPPS to react appropriately. Conventional HIPPS may have limited space for flow lines. Moreover, such HIPPS employ complex designs and often require a significant amount of testing after placement.

Figure 1A:
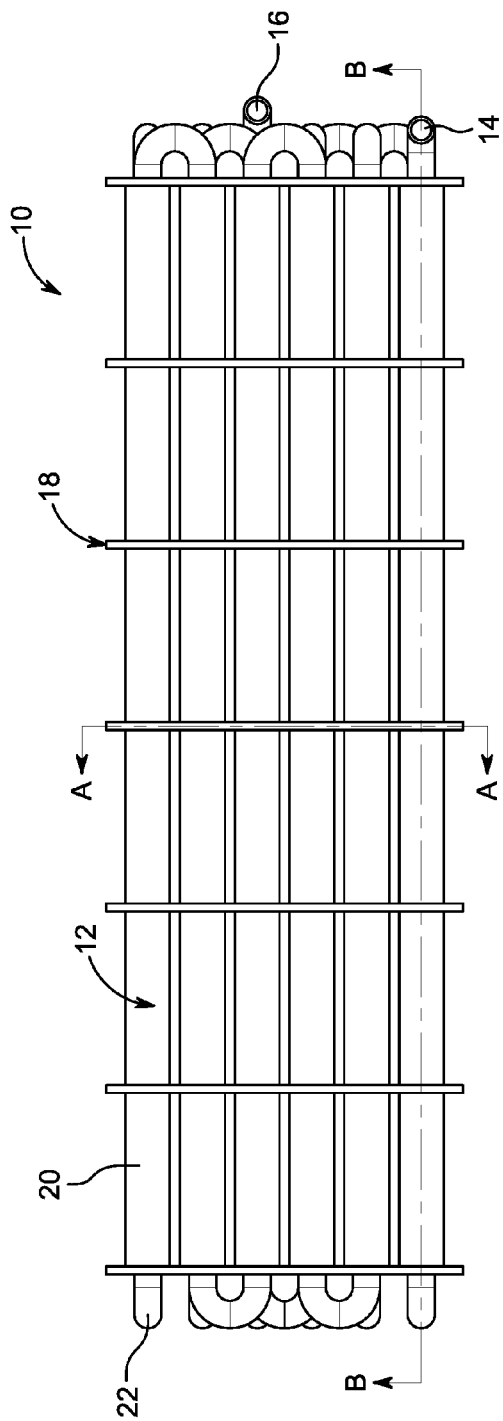
FIG. 1A depicts a side view of a serially arranged flow line of a module according to one embodiment of the present disclosure.
Figure 1B:
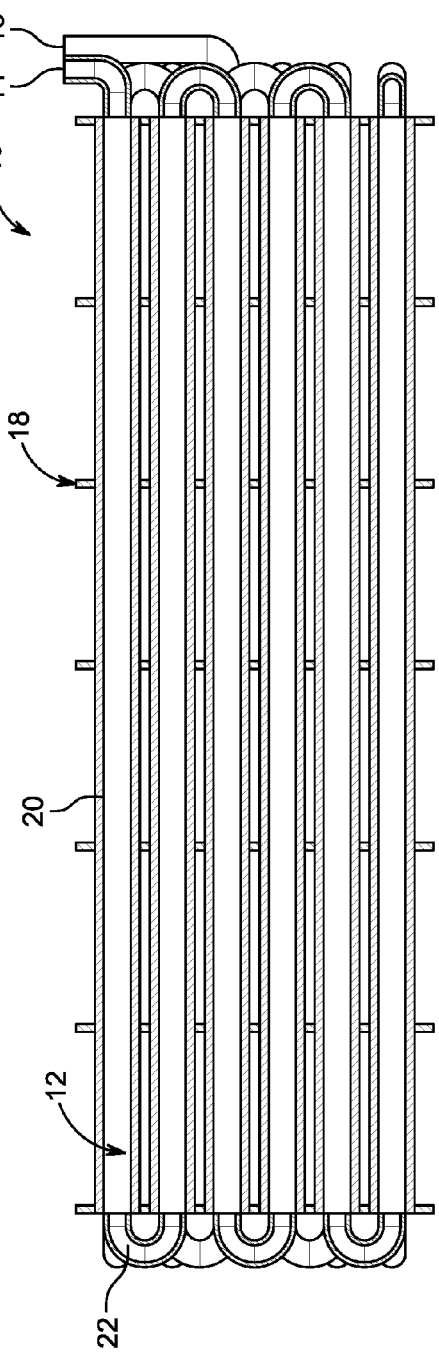
FIG. 1B depicts a sectional view of the FIG. 1A embodiment.

Referring to FIGS. 1A-B, there is shown one non-limiting embodiment of a module 10 that may be used in a fortified zone to convey fluids from an HIPPS to a subsea production system or a host. The module 10 may be configured to convey fluids for a distance sufficient to detect one or more flow parameters in a footprint that is smaller than conventional flow lines. Moreover, the module 10 employs a simplified design architecture that can reduce manufacturing costs. Further, most, if not all, of the module 10 can be pre-tested at a fabrication facility or dockyard before installation.

In one embodiment, the module 10 may include a flow line 12, an inlet 14, and an outlet 16. Optionally, a frame 18 may be used to house the flow line 12. The inlet 14 can connect to and receive fluids from a HIPPS (not shown) and the outlet can connect and flow fluid to a subsea production system (not shown). The frame 18 may include axially spaced-apart plates or any other structure suitable for supporting the flow line 12. In the embodiment shown, the flow line 12 includes a plurality of linear segments 20 that are interconnected by joints 22. The linear segments 20 are arranged to convey fluids in a hydraulically serial fashion from the inlet 14 to the outlet 16. It should be noted that a plurality of the linear segments 20 are arranged in a geometrically parallel fashion; i.e., side by side. Thus, at least a portion of each of the parallel segments lie along a common distance. It should be understood that while the linear segments 20 are geometrically parallel, they convey fluid in only a serial fashion. That is, there are no manifolds or other devices that split fluid flow.

Figure 2A:
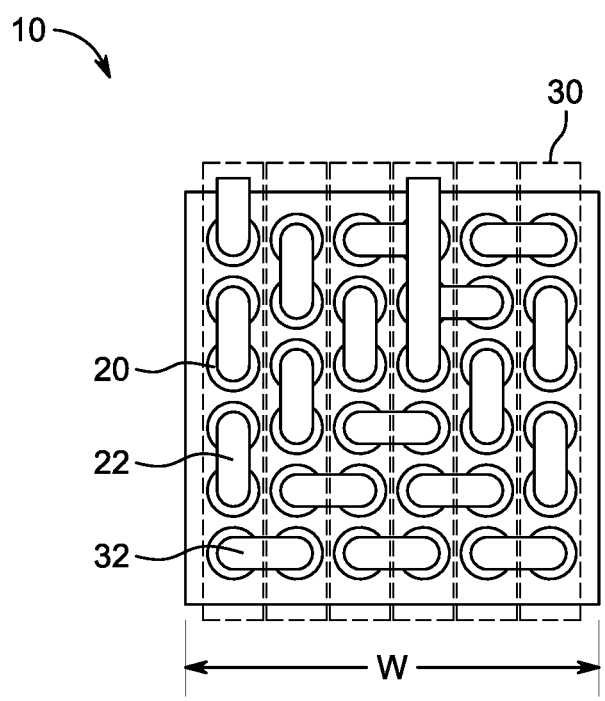
FIG. 2A depicts an end view of the FIG. 1A embodiment.
Figure 2B:
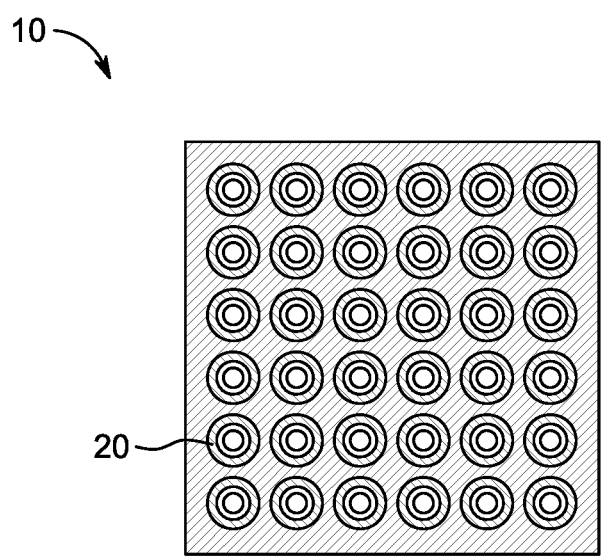
FIG. 2B depicts a cross-sectional view of the FIG. 1A embodiment.

Referring to FIG. 2A, the linear segments 20 may be horizontally stacked such that the module 10 includes a plurality of stacks 30 of linear segments 20. The stacks 30 are each aligned with planes that are parallel with one another. Joints 22 transfer fluid between linear segments 20 within a stack 30 and joints 32 transfer fluid between stacks 30. The joints 22, 32 may be elbows, U-bends or any other joint suitable for reversing flow. As shown, the flow line 12 is shown formed as a "box." However, the flow line 12 may be stacked or compacted in other shapes also. Referring to FIG. 2B, it should be appreciated that the individual linear segments 20 provide a compact and versatile arrangement for conveying fluids. The segments 20 may be stacked horizontally and/or vertically while still providing a continuous flow path within a compact volume. It should be noted that the fluid flow has two directional aspects.

The fluid enters via the inlet 14 (FIG. 1A) and travels in a first direction along an outer stack 30 as the joints 22 reverse the flow of fluid. Then, the fluid flows in a second direction from between adjacent stacks 30 via the joints 32. Next, the fluid travels along another outer stack 30 via the joints 22 in a third direction that is opposite of the first direction. Thereafter, the fluid travels in a fourth direction that is opposite to the second direction between adjacent stacks 22 via the joints 32. This flow pattern is repeated in a manner that flow effectively spirals to the outlet 16 (FIG. 1A). More precisely, the flow pattern uses reversing flow along non-parallel planes.

Figure 3:
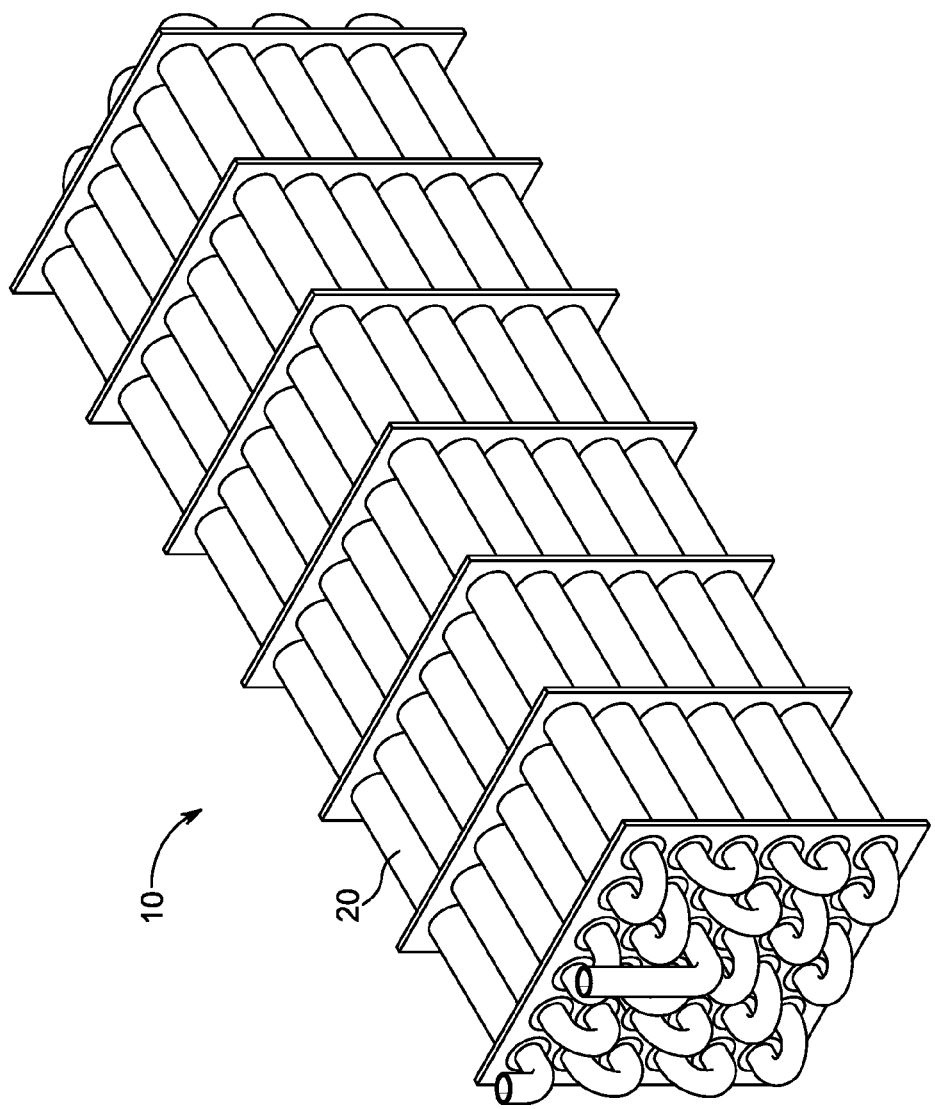
FIG. 3 depicts an isometric view of a module according to one embodiment of the present disclosure.

Referring now to FIG. 3, there is shown an isometric view of one non-limiting module 10 of the present disclosure. It should be appreciated that the strategic use and placement of the linear segments 20 effectively provide a significant length of pipeline in a relatively compact area. Instead of potentially installing thousands of feet of conventional fortified zone pipeline to protect a lower pressure/smaller wall thickness pipeline, a compact structure (or series of structures) can contain the same length of fortified zone pipeline, which can lead to significant cost savings over conventional structures or flowlines. In some embodiments, the module 10 can be placed at an underwater location, such as the seabed, to convey fluid between a first system and a separate second system, both of which are also underwater. In embodiments, the module and the flowline may be in physical contact with the surrounding water. A HIPPS and production facility are only non-limiting examples of such systems. Other non-limiting systems include pumps, pipelines, storage tanks, vehicles, etc.

Use of modules in accordance with the present disclosure has still further advantages vis-à-vis conventional structures or flowlines. For instance, the module 10 may use qualified API flanges, which may minimize or eliminate field welding of pipe joints. In some instances, the module 10 may be constructed to minimize or eliminate the need for several pipeline end terminations and jumpers in the fortified zone. That is, instead of installing potentially dozens of subsea structures, a single subsea structure containing the fortified zone module may be installed. It will be appreciated that these features can simplify installation and reduce construction time and associated risk. Moreover, it should also be appreciated that systems and methods of the present disclosure may simplify factory acceptance tests and system integration tests thus reducing costs.

It is emphasized that the FIGS. 1A-B and 2A-B merely illustrate only one embodiment according to the present teachings. The present disclosure is susceptible to numerous embodiments that can incorporate variations in shapes, orientation, and construction. For example, in some embodiments, the module 10 can be grouped together in a modular format. Such modules may use flanged ends to connect individual modules. In other embodiments, blocks or billets may be used instead of conventional pipes and joints. In such embodiments, straight flow sections may be formed out of solid blocks and jumpers or connectors may be used to interconnect the straight flow sections. Such an embodiment may be suited for larger wall thicknesses.

From the above, it should be appreciated that what has been described includes a system for conveying fluids at a subsea location; i.e., below the water's surface. The system may include a high-integrity pressure protection system (HIPPS) supplying fluid; a module connected to the HIPPS and receiving the fluids into a flow line formed of plurality of linear sections, wherein at least two linear sections are geometrically parallel, the flow line being shaped to reverse flow in the module a plurality of times; an outlet connected to the flow line; and a subsea production system connected to the module via the outlet and receiving the fluids from the flow line. The flow line communicates fluid between the inlet and the outlet in a hydraulically serial fashion. The flow line includes a plurality of bends reversing the flow of fluids in adjacent linear sections. The system may include a plurality of stacks of linear sections.

From the above, it should be also appreciated that what has been described includes a method for conveying fluids at a subsea location. The method may include positioning a module at a subsea location, the module having a flow line for flowing fluids in a serial fashion from a single inlet to a single outlet, the flow line being shaped to reverse flow of the fluids a plurality of times along each plane of a plurality of planes; flowing fluids from a high-integrity pressure protection system (HIPPS) to a subsea production system via the module; and flowing fluids from a high-integrity pressure protection system (HIPPS) to a subsea production system via the module. The method may also include assembling the module at a land facility before positioning the module at the subsea location and/or testing pressure integrity of the module at a land facility before positioning the module at the subsea location.

From the above, it should be further appreciated that what has been described includes a system for conveying fluids at a subsea location. The system may include a module having a flow line flowing fluids in a serial fashion from a single inlet to a single outlet, the flow line being shaped to reverse flow of the fluids a plurality of times along each plane of a plurality of planes. The plurality of planes may be geometrically parallel to one another. The flow line may include a plurality of stacks of linear sections, wherein each stack is aligned with at least one plane of the plurality of planes. The flow line may include a plurality of U-shaped bends, each U-shaped bend flowing fluids from one of: (i) between linear sections of one stack, and (ii) between stacks of linear sections. The system may include a frame to which all of the stacks of linear sections are connected. The module may define a volume and the fluid line flows fluid along a plurality of non-parallel planes in the volume. The system may also include a high-integrity pressure protection system connected to the module and a subsea host connected to the module.

It is emphasized that the present disclosure is susceptible to embodiments of different forms. There embodiments shown in the drawings and described in detail above are presented with the understanding that the present disclosure is to be considered an exemplification of the principles of the disclosure, and is not intended to limit the disclosure to that illustrated and described above. Thus, other and further embodiments of the disclosure may be devised without departing from the basic scope thereof, and the scope thereof is determined by the claims that follow.

What is claimed is:

1. A system for conveying fluids at an underwater subsea location, comprising:
   a high-integrity pressure protection system (HIPPS) supplying fluid positioned at the underwater subsea location;
   a module positioned at the underwater subsea location and connected to the HIPPS, the module receiving the fluids into a flow line formed of plurality of linear sections, wherein at least two linear sections are geometrically parallel, the at least two linear sections connected to and supported by at least two axially spaced-apart plates, the flow line being shaped to reverse flow in the module a plurality of times, wherein the flow line conforms to a flow pattern that reverses flow along non-parallel planes;
   an outlet connected to the flow line; and
   a subsea production system positioned at the underwater subsea location and connected to the module via the outlet and receiving the fluids from the flow line.

2. The system of claim 1 wherein the flow line communicates fluid between the inlet and the outlet in a hydraulically serial fashion.

3. The system of claim 1, wherein the flow line includes a plurality of bends reversing the flow of fluids in adjacent linear sections.

4. The system of claim 1, further comprising a plurality of stacks of linear sections, wherein all of the plurality of stacks of linear sections are connected to and supported by at least two axially space-apart plates.

5. A method for conveying fluids at an underwater subsea location, comprising:
positioning a module at the underwater subsea location, the module having a flow line for flowing fluids in a serial fashion from a single inlet to a single outlet, the flow line being shaped to reverse flow of the fluids a plurality of times along each plane of a plurality of planes, and wherein the flow line conforms to a flow pattern that reverses flow along non-parallel planes; and
flowing fluids from a high-integrity pressure protection system (HIPPS) to a subsea production system via the module.

6. The method of claim 5, further comprising:
assembling the module at a land facility before positioning the module at the underwater subsea location.

7. The method of claim 5, further comprising:
testing pressure integrity of the module at a land facility before positioning the module at the underwater subsea location.

8. A system for conveying fluids at a subsea location, comprising:
a module positioned at the subsea location and having a flow line flowing fluids in a serial fashion from a single inlet to a single outlet, the flow line being shaped to reverse flow of the fluids a plurality of times along each plane of a plurality of planes, wherein the plurality of planes are geometrically parallel to one another; the flow line includes a plurality of stacks of linear sections, each stack being aligned with at least one plane of the plurality of planes; the flow line includes a plurality of U-shaped bends, each U-shaped bend flowing fluids from one of: (i) between linear sections of one stack, and (ii) between stacks of linear sections; and the module defines a volume and the fluid line flows fluid along a plurality of non-parallel planes in the volume, wherein the plurality of stacks of linear sections are connected to and supported by at least two axially spaced-apart plates;
a frame to which all of the stacks of linear sections are connected; and
a high-integrity pressure protection system connected to the module; and a subsea production system connected to the module.

* * * * *